United States Patent [19]
Kodaira et al.

[11] Patent Number: 5,864,189
[45] Date of Patent: Jan. 26, 1999

[54] YOKE ARRANGEMENT FOR AN ELECTRIC MOTOR HAVING AN IMPROVED MECHANICAL STRENGTH

[75] Inventors: Tadao Kodaira, Maebashi; Tsugio Onodera, Gunma; Susumu Aoki, Kiryu, all of Japan

[73] Assignee: Mitsuba Corporation, Japan

[21] Appl. No.: 887,160

[22] Filed: Jul. 2, 1997

[30] Foreign Application Priority Data

Jul. 11, 1996 [JP] Japan ..................................... 8-201234

[51] Int. Cl.⁶ .............................. H02K 5/00; H02K 5/24; B62D 5/04
[52] U.S. Cl. ................................ 310/89; 310/43; 310/91; 180/140; 180/148
[58] Field of Search ................................... 310/43, 89, 91; 180/140, 148, 154, 79.1, 133, 142

[56] References Cited

U.S. PATENT DOCUMENTS

| | | | |
|---|---|---|---|
| 4,666,010 | 5/1987 | Morishita et al. ..................... | 180/79.1 |
| 4,724,917 | 2/1988 | Naito et al. ............................. | 180/79.1 |
| 4,828,062 | 5/1989 | Shimizu ................................... | 180/140 |
| 5,355,968 | 10/1994 | Smith ...................................... | 175/320 |

*Primary Examiner*—Thomas M. Dougherty
*Assistant Examiner*—Tran N Nguyen
*Attorney, Agent, or Firm*—Marshall & Melhorn

[57] ABSTRACT

In a yoke arrangement for electric motors which are particularly suitable for use in electric power steering devices, the yoke comprises a first tubular portion, a second tubular portion which has a smaller diameter than the first tubular portion, and a tapered section connecting the two tubular portions. The length of the tapered sections is desired to be minimized so that the overall length of the electric motor may be minimized. Reducing the length of the tapered section and thereby increasing the taper angle of the tapered section leads to the reduction in the mechanical strength of the yoke against an axial force. To compensate for this reduction in mechanical strength, the wall thickness of the tapered section is made larger than that of the first portion. Thus, the overall mechanical strength of the yoke can be ensured with a minimum increase in the material cost and manufacturing cost. The yoke may be formed by plastic deformation such as swaging and expansion.

10 Claims, 4 Drawing Sheets

YOKE ARRANGEMENT FOR AN ELECTRIC MOTOR HAVING AN IMPROVED MECHANICAL STRENGTH

TECHNICAL FIELD

The present invention relates to a yoke arrangement for an electric motor, and in particular to a yoke arrangement for an electric motor which is incorporated in an electric power steering device. More particularly, the present invention is related to a yoke arrangement for an electric motor having an improved mechanical strength.

BACKGROUND OF THE INVENTION

According to a known electric power steering device for motor vehicles, the motor shaft consists of a hollow shaft, and a drive shaft connected to the right and left steerable wheels via tie rods is coaxially received in the motor shaft. A ball nut arrangement is interposed between the hollow motor shaft and the drive shaft for converting the rotational movement of the hollow motor shaft into the axial movement of the drive shaft.

FIG. 3 illustrates a conventional electric power steering device which comprises a yoke 1 consisting of an axially elongated tube member serving also as a part of the housing for the power steering device, and a gear casing which accommodates a rack and pinion gear mechanism and coaxially attached to the yoke 1 via a radial flange to form the rest of the housing for the power steering device.

The yoke 1 and the gear casing 2 thus jointly form the housing for the power steering device, and coaxially receive therein a drive shaft 3 which is axially slidable so as to steer the right and left front wheels via the tie rods attached to either axial end thereof. The drive shaft 3 is connected to the rack of a rack and pinion gear device, and the pinion thereof is attached to a pinion shaft 4 which is connected to a steering shaft.

An intermediate part of the drive shaft 3 is coaxially received in a hollow motor shaft 5. A motor armature core 6a and a commutator 6b are attached to the outer circumferential surface of the hollow motor shaft 5 so that the armature core 6a and the hollow motor shaft 5 rotate integrally together. A ball nut mechanism is interposed between the inner circumferential surface of the hollow motor shaft 5 and the outer circumferential surface of the drive shaft 3 to convert the rotational movement of the hollow motor shaft 5 to the axial movement of the drive shaft 3. The rotational torque produced from the motor armature 6 is thus converted into the axial assist force for the drive shaft 3 so that the effort required for turning the steering wheel attached to the pinion shaft 4 may be reduced.

The power steering device normally extends laterally across the vehicle body which is not shown in the drawing, and is attached to the vehicle body via a bracket 2a formed in the gear casing 2 and a mounting bracket 13 partly surrounding a small diameter portion 1c of the yoke 1.

These brackets 2a and 13 are normally secured to the vehicle body by fasteners such as threaded bolts. The main part 1a of the yoke surrounding the motor armature 6a is necessarily larger in diameter than the small diameter portion 1c of the yoke 1 which is to be mounted to the vehicle body via the bracket 13, and it is necessary to connect the small diameter portion with the rest of the yoke with a tapered section 1d.

BRIEF SUMMARY OF THE INVENTION

During the operation of the electric power steering system described above, the reaction from the road surface which is applied to the steerable wheels are transmitted to the power steering device via the tie rods. In particular, the reaction force is transmitted to the drive shaft 3, and further to the ball bearing for the motor shaft 3 via the ball nut mechanism and the motor armature. However, when the steering wheel is turned all the way in either direction, the coupling between one of the tie rods and the associated end of the drive shaft abuts an open end of the yoke, and produces a compressive load in the yoke. Such a compressive load can be easily supported by the parts of the yoke having a uniform diameter, but the tapered sections are relatively less capable of withstanding such a load.

Reducing the tapering angle of such a tapered section is beneficial in increasing the mechanical strength of the yoke against an axial force, but this leads to an increase in the length of the tapered section. The overall length of the yoke is dictated by the mounting space available for the power steering device, and any increase in the length of the tapered section must be compensated for by a corresponding reduction in the length of a section having a uniform diameter. However, each section having a uniform diameter is required to have a certain length. For instance, the small diameter portion 1c adjacent to the open end of the yoke must be at least as long as the width of the mounting bracket 13. An intermediate portion 1b also must be at least as long as the width of the bearing for supporting the motor shaft. The main portion 1a of the yoke is also required to have a sufficient length to accommodate the motor arrangement therein.

Therefore, it may be conceivable to reduce the length L2 of the tapered section 1d by increasing the tapering angle thereof to θ2. However, if the tapering angle θ2 is increased, it becomes less capable of withstanding the axial load. A deformation in the yoke 1 may lead to the failure of the power steering device to operate properly.

In view of such problems of the prior art, a primary object of the present invention is to provide an improved yoke arrangement for an electric motor having an improved mechanical strength.

A second object of the present invention is to provided an improved yoke arrangement for an electric motor which is suitable for use in electric power steering devices.

A third object of the present invention is to provided an improved yoke arrangement for an electric motor which is reliable in use and economical to manufacture.

According to the present invention, these and other objects can be accomplished by providing a yoke arrangement for an electric motor, comprising a yoke made of a generally cylindrical member which is at least partly made of magnetic material, the yoke comprising: a main portion which is adapted to carry magnetic field generating means, and surrounds a motor armature which cooperates with the magnetic field generating means to form an electric motor; a first portion connected to the main portion and provided with a substantially uniform first diameter; a second portion formed in an axially spaced relationship to the first portion and provided with a substantially uniform second diameter, the second diameter being substantially smaller than the first diameter; a tapered section having a frustoconical shape, and smoothly connecting the first portion and second portion; wherein the tapered section has a wall thickness which is substantially greater than that of the first portion.

Because the wall thickness of the tapered section is made larger than that of the first portion, the mechanical strength of the tapered section is increased so that the overall mechanical strength of the yoke against an axial force is increased without increasing the length of the tapered section. Reducing the length of the tapered section and thereby increasing the taper angle of the tapered section leads to the reduction in the mechanical strength of the yoke against an axial force, but the increased wall thickness of the tapered section eliminates this problem. The first portion may consist of the main portion itself, but more typically the first portion is provided between the second portion and the main portion via tapered sections so as to define a uniform diameter section for receiving a bearing for the motor shaft. To optimize the strength of the tapered section for a given amount of the material, the tapered section may have a wall thickness which gradually increases from the first portion to the second portion.

The yoke may be formed by plastic deformation such as swaging and expansion. "Swaging" as used herein means any process which can reduce the diameter of a tubular member by a punch and/or die which may be rotating or non-rotating, or by using fluid pressure. "Expansion" similarly means any process which can increase the diameter of a tubular member by a punch and/or die which may be rotating or non-rotating, or by using fluid pressure. According to a preferred embodiment of the present invention, the yoke is made by swaging a part of a tubular blank material originally having a substantially same diameter as the main portion into having at least one smaller diameter portion which is connected to a relatively larger diameter portion by the tapered section.

Alternatively, the yoke may be made by swaging and expanding different parts of a tubular blank material originally having a substantially same diameter as the first portion into having at least the second portion and the main portion, respectively. It is also possible to make the yoke by expanding a part of a tubular blank material originally having a substantially same diameter as the second portion into having at least the first portion which is connected to the first portion by the tapered section.

Typically, the electric motor is incorporated in a power steering device, and the yoke at least partly defines a housing for the power steering device. The remaining part of the housing for the power steering device may consist of casing which accommodates a rack and pinion gear mechanism of the power steering device.

According to a particularly preferred embodiment of the present invention, the power steering device further comprises: a hollow motor shaft coaxially and rotatably received in the yoke, and coaxially carrying the motor armature; a drive shaft coaxially and axially slidably received in the hollow motor shaft, and provided with a threaded section; and a threaded nut mechanism including a nut member which is coaxially and fixedly secured in the hollow motor shaft and threadably engages with the threaded section of the drive shaft so as to convert a rotational movement of the motor shaft into an axial movement of the drive shaft.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
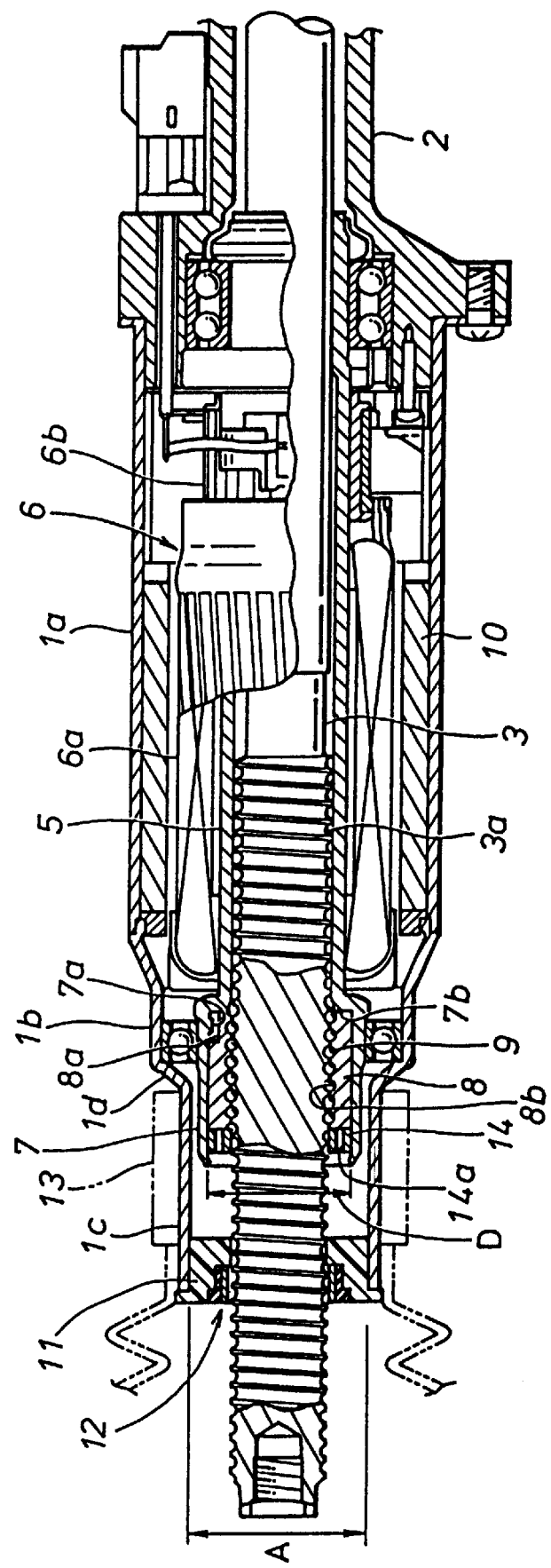
FIG. 1 is a sectional side view of an electric power steering device to which the present invention is applied.

Referring to FIG. 1, an armature core 6a is fixedly secured to an intermediate part of the outer circumferential surface of the hollow motor shaft 5, and the motor shaft 5 is provided with an end portion having a somewhat enlarged outer diameter so as to serve as a nut retaining portion 7 which coaxially and fixed receives a ball nut 8 therein. The ball nut 8 is axially positioned inside the nut retaining portion 7 by abutting an outward facing annular shoulder 7b formed in the nut retaining portion 7, and is retained in this position by threading a lock nut 14 into the nut retaining portion 7 by means of inner and outer threads formed in the inner circumferential surface of the nut retaining portion 7 and the outer circumferential surface of the lock nut 14, respectively, and crimping a free end of the nut retaining portion 7 against the outer end surface of the lock nut 14. The inner circumferential surface of the nut retaining portion 7 is provided with a radial projection 7a which fits into a corresponding slot 8a provided in the ball nut 8 to secure the ball nut 8 rotationally fast to the nut retaining portion 7.

A part of the outer circumferential surface of the drive shaft 3 is formed with a spiral thread groove 3a, and the inner circumferential surface of the ball nut 8 is provided with a corresponding spiral thread groove 8b so that these thread grooves 3a and 8a define a spiral passage for receiving a plurality of steel balls 9 therein. This ball nut mechanism allows the rotational movement of the nut 8 or the motor shaft 5 to be converted into the axial movement of the drive shaft 3 in a relatively friction free manner.

The yoke 1 comprises a main portion or a large diameter portion 1a having permanent magnets 10 attached thereto, a shaft supporting portion 1b which is reduced in diameter and has a bearing fitted therein for rotatably supporting the nut retaining portion 7. The shaft supporting portion 1b has a uniform diameter, and is connected to the large diameter portion 1a via a frustoconical tapering section. A small diameter portion 1c which is even further reduced in diameter than the shaft supporting portion 1b is connected to the other end of the shaft supporting portion 1b via another frustoconical tapering section 1d. The small diameter portion 1c extends axially from an extreme free end of the yoke 1 to a point of the yoke 1 surrounding the nut retaining portion 7, and has a uniform diameter.

An annular end piece 11 made of plastic material is press fitted into the open end of the small diameter portion 1c, and the inner circumferential surface of the end piece 11 is provided with a stopper 12 consisting of a metallic sleeve closely surrounding the drive shaft 3 and fixed to the inner surface of the end piece 11 via an annular rubber member. The stopper 12 restricts the axial movement of the drive shaft by a part of the knuckle arm (not shown in the drawing) attached to the drive shaft 3 abutting the stopper 12 when the steering wheel is turned all the way in either direction. A bracket 13 is passed around the small diameter portion 1c of the yoke 1 to secure the yoke 1 to the vehicle body.

The shape of the yoke 1 is described in more detail with reference to FIG. 2. The large diameter portion 1a is made from a tubular blank material by expansion, and the small diameter portion 1c is thereafter formed by swaging. The shaft supporting portion 1b may have a same diameter as the tubular blank material. The small diameter portion 1a and the shaft supporting portion 1c are connected by the tapered section 1d, and the wall thickness of the tapered section 1d progressively increases from the shaft supporting portion end to the small diameter portion end. As indicated in FIG.

2, if the wall thickness of the part of the tapering section adjoining the shaft supporting portion 1c is given as t1, and the wall thickness of the part of the tapering section adjoining the small diameter portion 1c is t2, then t1<t2.

Figure 2:
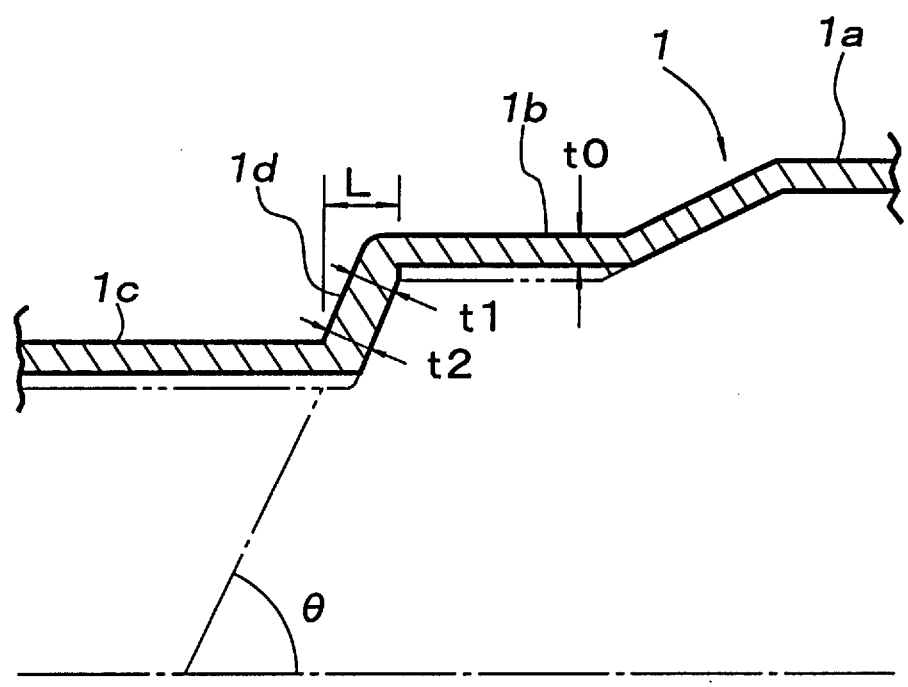
FIG. 2 is an enlarged view of an essential part of FIG. 1.
Figure 3:
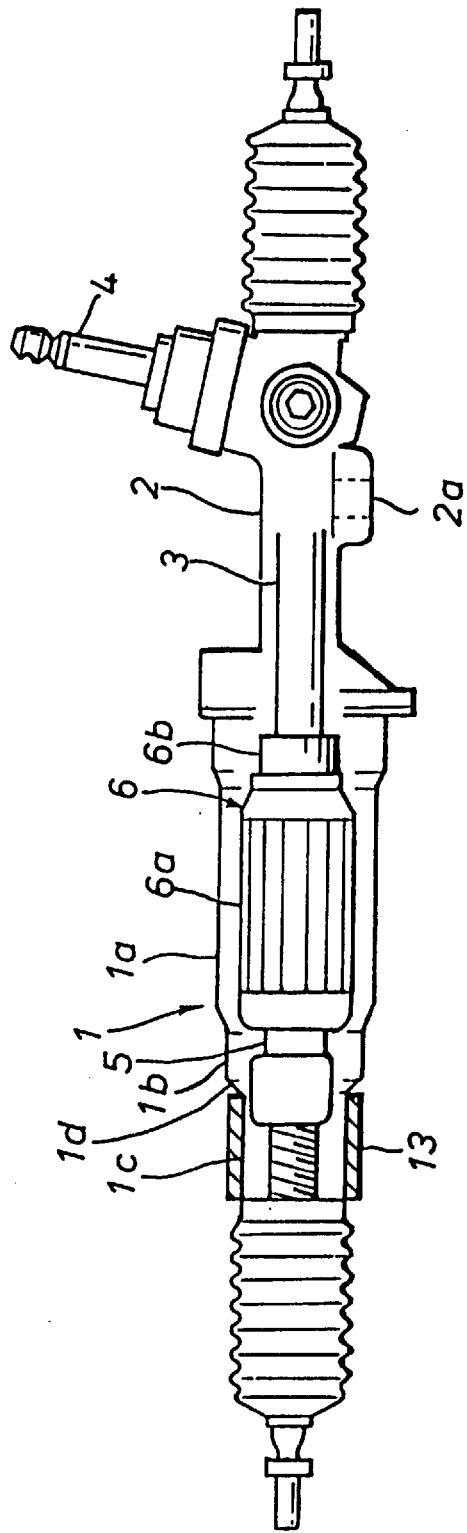
FIG. 3 is an overall view of the electric power steering device.
Figure 4:
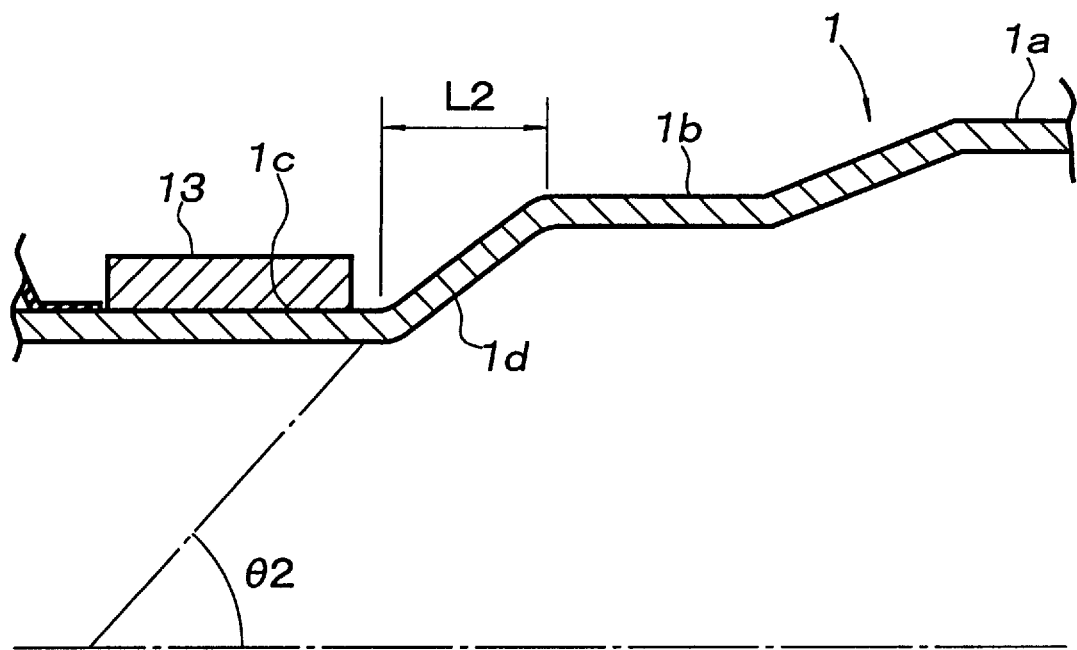
FIG. 4 is a view similar to FIG. 2 showing a conventional arrangement.

In particular, the inner circumferential surfaces of the small diameter portion 1b and the shaft supporting portion 1c are machined into prescribed inner diameters as indicated by the imaginary lines in FIG. 2 so as to accurately fit the end piece 11 and the bearing for the nut retaining portion 7, respectively. Therefore, if the wall thickness of the small diameter portion 1b and the shaft supporting portion 1c is t0 (although these two portions may have different wall thicknesses), then t0<t1<t2.

By thus increasing the wall thickness of the tapered section 1d, it is possible to reduce the axial length L of the tapered section and increase the taper angle of the tapered section 1d while ensuring a sufficient mechanical strength to the yoke 1 against an axial force.

In this embodiment, the yoke 1 was formed from a tubular blank having a substantially same diameter as the shaft supporting portion 1b, but it is also possible to use a tubular blank having a substantially same diameter as the small diameter portion 1c, and expand the shaft supporting portion 1b and the large diameter portion 1a to the required outer diameters. Alternatively, the tubular blank material may have a substantially same diameter as the large diameter portion, and form the small diameter portion 1c and the shaft supporting portion 1b by swaging into the required outer diameters. In any case, the wall thickness of the tapered section 1d would be as described above with reference to FIG. 2. The method for forming the yoke is not limited by those mentioned above, and can consist of any method which accomplishes a plastic deformation of the yoke into a prescribed shape.

The above description was directed to an electric power steering device, but the present invention is equally applicable to other forms of electric motors as long as the yoke of the motor has a plurality of sections having different diameters, and are subjected to any axial load.

Although the present invention has been described in terms of a preferred embodiment thereof, it is obvious to a person skilled in the art that various alterations and modifications are possible without departing from the scope of the present invention which is set forth in the appended claims.

What we claim is:

1. A yoke arrangement for an electric motor, comprising a yoke made of a generally cylindrical member which is at least partly made of magnetic material, said yoke comprising:
    a main portion which is adapted to carry magnetic field generating means, and surrounds a motor armature which cooperates with said magnetic field generating means to form an electric motor;
    a first portion connected to said main portion and provided with a substantially uniform first outer diameter;
    a second portion formed in an axially spaced relationship to said first portion and provided with a substantially uniform second outer diameter, said second outer diameter being substantially smaller than said first outer diameter; and
    a tapered section having a frustoconical shape, and smoothly connecting said first portion and second portion;
    wherein said tapered section has a wall thickness which is substantially greater than that of said first portion.

2. A yoke arrangement for an electric motor according to claim 1, wherein said tapered section has a wall thickness which is also substantially greater than that of said second portion.

3. A yoke arrangement for an electric motor according to claim 1, wherein said tapered section has a wall thickness which gradually increases from said first portion to said second portion.

4. A yoke arrangement for an electric motor according to claim 1, wherein said yoke is made by swaging a part of a tubular blank material originally having a substantially same diameter as said main portion into having at least one smaller diameter portion which is connected to a relatively larger diameter portion by said tapered section.

5. A yoke arrangement for an electric motor according to claim 1, wherein said yoke is made by swaging and expanding different parts of a tubular blank material originally having a substantially same diameter as said first portion into having at least said second portion and said main portion, respectively.

6. A yoke arrangement for an electric motor according to claim 1, wherein said yoke is made by expanding a part of a tubular blank material originally having a substantially same diameter as said second portion into having at least said first portion which is connected to said first portion by said tapered section.

7. A yoke arrangement for an electric motor according to claim 1, wherein said electric motor is incorporated in a power steering device, and said yoke at least partly defines a housing for said power steering device.

8. A yoke arrangement for an electric motor according to claim 7, wherein said yoke defines said housing for said power steering device jointly with a casing which accommodates a rack and pinion gear mechanism of said power steering device.

9. A yoke arrangement for an electric motor according to claim 7, wherein said power steering device further comprises:
    a hollow motor shaft coaxially and rotatably received in said yoke, and coaxially carrying said motor armature;
    a drive shaft coaxially and axially slidably received in said hollow motor shaft, and provided with a threaded section; and
    a threaded nut mechanism including a nut member which is coaxially and fixedly secured in said hollow motor shaft and threadably engages with said threaded section of said drive shaft so as to convert a rotational movement of said motor shaft into an axial movement of said drive shaft.

10. A yoke arrangement for an electric motor, comprising a yoke made of a generally cylindrical member which is at least partly made of magnetic material, said yoke comprising:
    a main portion which is adapted to carry magnetic field generating means, and surrounds a motor armature which cooperates with said magnetic field generating means to form an electric motor;
    a first portion connected to said main portion and provided with substantially uniform inner and outer diameters;
    a second portion formed in an axially spaced relationship to said first portion and provided with substantially uniform inner and outer diameters, the outer diameter of said second portion being substantially smaller than the outer diameter of said first portion; and
    a tapered section having a frustoconical shape, and smoothly connecting said first portion and second portion;
    wherein said tapered section has a wall thickness which is substantially greater than that of said first portion.

* * * * *